United States Patent
Taima

(10) Patent No.: US 10,664,209 B2
(45) Date of Patent: May 26, 2020

(54) IMAGE FORMING APPARATUS

(71) Applicant: Konica Minolta, Inc., Chiyoda-ku, Tokyo (JP)

(72) Inventor: Katsuyuki Taima, Hiratsuka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/182,701

(22) Filed: Nov. 7, 2018

(65) Prior Publication Data

US 2019/0163420 A1 May 30, 2019

(30) Foreign Application Priority Data

Nov. 30, 2017 (JP) ................. 2017-229903

(51) Int. Cl.
*H04N 1/00* (2006.01)
*G06F 3/12* (2006.01)
*G06F 21/60* (2013.01)

(52) U.S. Cl.
CPC .......... *G06F 3/1238* (2013.01); *G06F 3/1205* (2013.01); *G06F 3/1222* (2013.01); *G06F 21/608* (2013.01)

(58) Field of Classification Search
CPC .... G06F 3/1238; G06F 21/608; G06F 3/1222; G06F 3/1205; G06F 3/1286
USPC ....................................................... 358/1.14
See application file for complete search history.

(56) References Cited

U.S. PATENT DOCUMENTS

2007/0133033 A1* 6/2007 Mizutani ............ H04N 1/00915
358/1.14
2019/0095152 A1* 3/2019 Kaneko ................. G06F 3/1238

FOREIGN PATENT DOCUMENTS

| JP | 2003-099328 | 4/2003 |
| JP | 2010-125712 | 6/2010 |

* cited by examiner

*Primary Examiner* — Saeid Ebrahimi Dehkordy
(74) *Attorney, Agent, or Firm* — BakerHostetler

(57) ABSTRACT

An image forming apparatus includes the following. A forming operating unit performs image forming based on image data. A data obtaining unit obtains the image data as a target of the image forming. An instruction obtaining unit obtains an operation instruction to instruct the forming operating unit to perform the image forming. An authentication receiver receives a predetermined authentication operation regarding approval of reception of the operation instruction. A hardware processor performs the image forming when a limit setting regarding a limit of reception of the operation instruction is set on the image data as the target of the image forming according to the obtained operation instruction and it is determined that the authentication receiver received the authentication operation. The instruction obtaining unit obtains a setting changing instruction to change the limit setting. The hardware processor changes the limit setting based on the obtained setting changing instruction.

9 Claims, 7 Drawing Sheets

| JOB ID | OBTAINED DATE/TIME | PERSON WHO OUTPUT ID | FILE NAME | SECRET SETTING | PASSWORD | DATA ADDRESS | DATA SIZE |
|---|---|---|---|---|---|---|---|
| 01245 | 20171101 14:15:38 | 0149 | DEPARTMENT MEETING SCHEDULE.pdf | 0 | | fa45 | 18.224 |
| 01246 | 20171101 14:19:45 | 0003 | 2018newproduct.ppt | 1 | nefbg4bghql88mpu | fa146 | 1465.336 |
| 01247 | 20171101 14:20:15 | 0045 | JPA_2015xxxxxx.pdf | 0 | | fa47 | 589.245 |
| 01248 | 20171101 14:26:24 | 0061 | 2018PERSONNEL AFFAIRS PLAN.odt | 1 | fq7bazt3 pn4abf2a | fa148 | 11.808 |

| ACCOUNT ID | DEPARTMENT ID | POSITION ID | USE FLAG |
|---|---|---|---|
| 0003 | 013 | 4 | 1 |
| 0039 | 013 | 2 | 1 |
| 0045 | 013 | 1 | 1 |
| 0061 | 013 | 1 | 0 |
| 0078 | 013 | 0 | 1 |
| 0079 | 013 | 0 | 1 |

FIG.7

| JOB ID | OBTAINED DATE/TIME | PERSON WHO OUTPUT ID | FILE NAME | SECRET SETTING | PASSWORD | SETTING TERM | DATA ADDRESS | DATA SIZE |
|---|---|---|---|---|---|---|---|---|
| 01245 | 20171101 14:15:38 | 0149 | DEPARTMENT MEETING SCHEDULE.pdf | 000 | | | fa45 | 18.224 |
| 01246 | 20171101 14:19:45 | 0003 | 2018newproduct.ppt | 100 | nefbg4bghql88mpu | 20180112 12:00:00 | fa46 | 1465.336 |
| 01247 | 20171101 14:20:15 | 0045 | JPA_2015xxxxx.pdf | 000 | | | fa47 | 589.245 |
| 01248 | 20171101 14:26:24 | 0061 | 2018PERSONNEL AFFAIRS PLAN.odt | 001 | fq7bazt3 pn4abf2a | | fa48 | 11.808 |

IMAGE FORMING APPARATUS

BACKGROUND

1. Technological Field

The present invention relates to an image forming apparatus.

2. Description of the Related Art

Among image forming apparatuses which form an image using color material such as toner or ink based on image data, there is an image forming apparatus which is connected to a network to be commonly owned and used by users of a plurality of terminals. Such image forming apparatus may hold job data such as image data input from each terminal for a predetermined term. In such image forming apparatus, the plurality of users input a predetermined instruction directly on the image forming apparatus or from each terminal so that image forming can be performed again based on the stored job data.

In such image forming apparatus, a plurality of users may output highly confidential contents. In such case, it is necessary to prevent such contents output on recording mediums from being seen by other users or to prevent such recording mediums from being taken away by other users as much as possible. In view of the above, there is a technique called secure print (confidential print). Here, after the terminal outputs an instruction to form an image from the user, the user performs a predetermined authentication process on the image forming apparatus main body, and with this, the image forming apparatus starts the image forming operation. Consequently, the user is able to immediately collect and obtain the recording medium output from the image forming apparatus.

Japanese Patent Application Laid-Open Publication No. 2003-99328 discloses a technique used in such secure print, and even if the user forgets the ID for authentication, an ID for unlocking (own ID, etc.) is used to release the limits on authentication. With this, printing can be performed normally. Japanese Patent Application Laid-Open Publication No. 2010-125712 discloses when there is another print job from another user, the authentication is received after the printing of such print job ends, and when there is no other print job, the printing can be performed immediately without authentication.

However, the time period and the range of people that need to be limited to keep the information a secret are usually changed. In such case, when the setting in the job data first input is maintained, it is difficult to flexibly cope with the change in the situation of whether secure print is necessary, and convenience decreases.

SUMMARY

The object of the present invention is to provide an image forming apparatus which is able to perform a printing process with flexibility and convenience without lowering the security level.

To achieve at least one of the abovementioned objects, according to an aspect of the present invention, an image forming apparatus reflecting one aspect of the present invention is described, an image forming apparatus including: a forming operating unit which performs image forming based on image data; a data obtaining unit which obtains the image data as a target of the image forming; a storage which stores the image data; an instruction obtaining unit which obtains an operation instruction to instruct the forming operating unit to perform the image forming; an authentication receiver which receives a predetermined authentication operation regarding approval of reception of the operation instruction; and a hardware processor which performs the image forming based on the image data by controlling the forming operating unit when a limit setting regarding a limit of reception of the operation instruction is set on the image data as the target of the image forming according to the obtained operation instruction and it is determined that the authentication receiver received the authentication operation, wherein, the instruction obtaining unit obtains a setting changing instruction to change the limit setting; and the hardware processor changes the limit setting based on the obtained setting changing instruction.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3A is a table describing contents of a job list.

FIG. 3B is a table describing contents of account information.

FIG. 7 is a table describing contents of the job list held by the RAM of the MFP according to a second embodiment.

DETAILED DESCRIPTION OF EMBODIMENTS

Embodiments of the present invention are described in detail with reference to the drawings. However, the scope of the invention is not limited to the disclosed embodiments.

Figure 1:
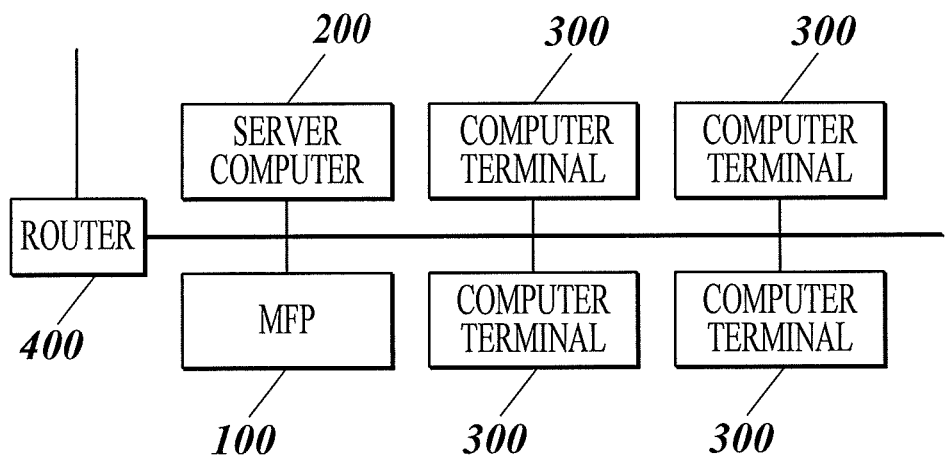
FIG. 1 is a diagram showing an entire system configuration including a MFP which is an image forming apparatus according to an embodiment of the present invention.

FIG. 1 is a diagram showing an entire system configuration including a MFP which is an image forming apparatus according to an embodiment of the present invention.

The above system is a Local Area Network (LAN) connected to an external network through a router 400, here, for example, an in-house LAN in a certain department of a company. Such system includes a multifunction peripheral (MFP) 100, a server computer 200, and a plurality of computer terminals 300, all of which are connected to the network. The connection can be a LAN cable or a wireless LAN can be used.

The MFP 100 is able to perform a printing operation regarding forming the image and a scanning operation regarding reading the image. Further, a FAX transmitting/receiving operation can be performed. The MFP 100 is able to perform a copying operation which forms an image of the image data read by the scanning operation as is.

The server computer 200 performs the management of the computer terminals 300 in the system and the users who can login to the computer terminal 300. The server computer 200 holds account information of the user who is able to use the LAN.

Each of the computer terminals 300 is used by each of the plurality of users. A controller (hardware processor) of the computer terminal 300 is able to execute software (application program) installed in each computer terminal 300 and/or provided from the server computer. The software is not limited and may include word processing software or presentation software. The controller of the computer terminal 300 is able to transmit to the MFP 100 instruction to output images such as a document or a resume based on the above data.

First Embodiment

The MFP 100 which is an image forming apparatus according to a first embodiment of the present invention is described.

Figure 2:
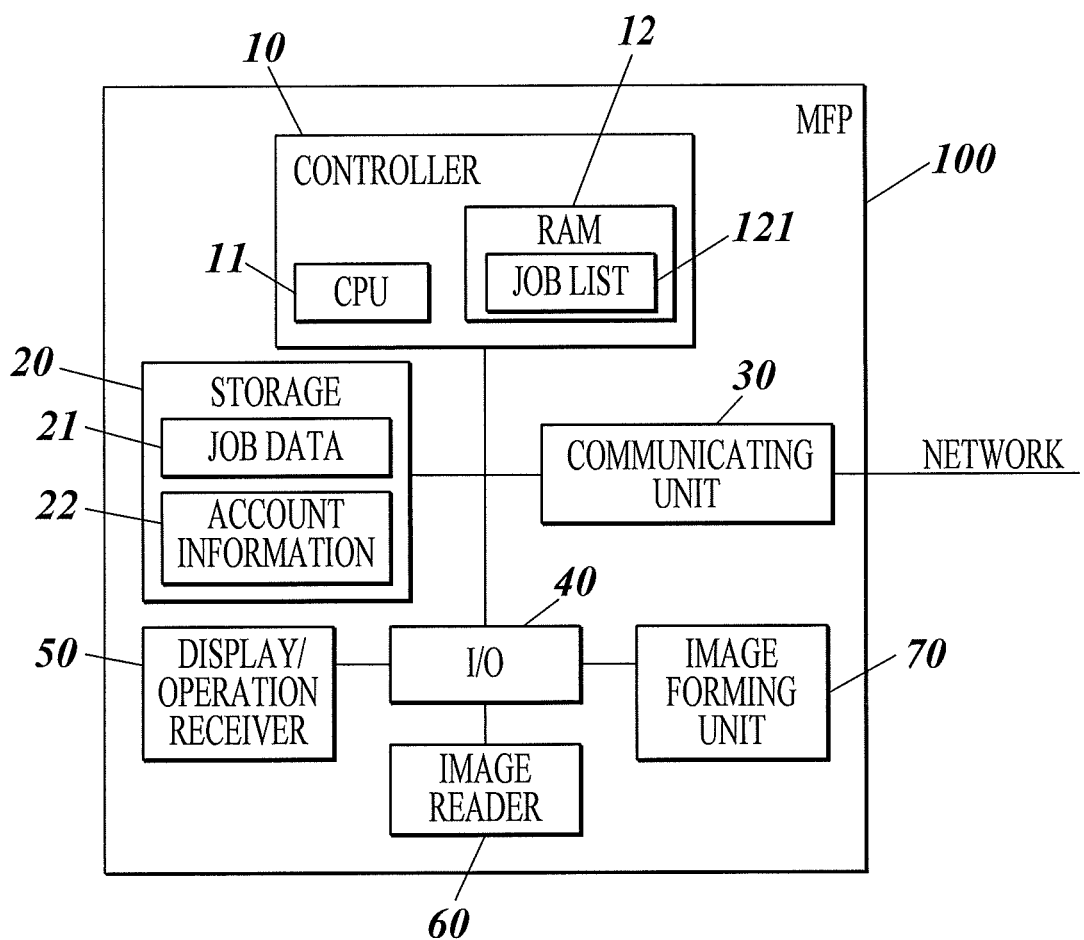
FIG. 2 is a block diagram showing a functional configuration of the MFP.

FIG. 2 is a block diagram showing a functional configuration of the MFP 100.

The MFP 100 includes a controller 10, a storage 20, a communicating unit 30, a display/operation receiver 50 (authentication receiver) connected through an interface (I/O 40) including a connection terminal or driver, an image reader 60 and an image forming unit 70 (forming operating unit).

The controller 10 is a hardware processor which centrally controls the operation of each unit of the MFP 100. The controller 10 includes a CPU 11 (Central Processing Unit) and a RAM 12 (Random Access Memory). The CPU 11 performs various calculating processes and various controlling processes. The RAM 12 provides a memory space for control to the CPU 11 and stores temporary data.

The RAM 12 stores a job list 121. The job list 121 shows a list of the job data 21 obtained and held by the MFP 100. The job list 121 may include an image forming operation which is executed or which is planned to be executed in the image forming unit 70 of the MFP 100 and a history of a scanning operation executed by the image reader 60.

The storage 20 includes a nonvolatile memory and a HDD (Hard Disk Drive), and is a storage device which is able to hold storage data while power supply to the MFP 100 is cut. The storage 20 stores job data 21, account information 22 (user setting) and the like.

The job data 21 includes image data as the target of image forming which is received from the computer terminal 300 or read by the image reader 60, and various information regarding the setting to print the image data. Once the job data 21 is obtained, each of the job data 21 is held until erased (including overwriting) according to a predetermined term and/or the storage capacity of the storage 20. Each of the job data 21 may be erased at any timing before being erased automatically according to a predetermined input operation by the user or a setting when the image forming instruction is obtained in the computer terminal 300. At least a target of secure print (confidential print) among image data stored as the job data 21 or related information is held encrypted.

FIG. 3A and FIG. 3B are tables describing contents of the job list 121 and the account information 22. As shown in FIG. 3A, the following items are stored as a list in the job list 121 which is the list of the job data 21, job ID, obtained date/time, output person ID, output file name, secret setting flag, password, data address, and data size.

As shown in FIG. 3A, in each job list 121 which is a list of the job data 21, the following are stored in a list, a job ID, an obtained date/time, an output person ID, an output file name, a secret setting, a password, a data address, and data size.

The job ID is a specific number (can include characters) specifying an obtained order of instruction for an image forming operation or an image reading operation. Here, for example, it is a five digit number.

The obtained date/time is the timing that each job is obtained, that is, received from the computer terminal 300 or the first instruction is received by the display/operation receiver 50. Basically, the job ID is set in the chronological order of the timing. As for the job data regarding the image forming instruction and the job data regarding the scanning operation by the image reader 60, a job ID with a different range of numeric value (when characters are included, character array range) can be set.

The output ID is obtained and set based on the account information 22 according to who (first person to output image) input the image forming instruction to the MFP 100.

The file name is the file name of the target of image forming. When the data is directly output from outside the file such as a screen displayed on the display, the name may be suitably set on the computer terminal 300.

The secret setting shows whether secure print is specified. When the secure print is specified (here, "1"), the authentication operation is necessary to perform the image forming operation.

The password is an authentication code to form the image regarding the job which is specified as secure print. In the job data 21, the password itself is encrypted and held according to a predetermined process. The password may be an array of numerals (PIN code) or may include a character string or certain symbols. Alternatively, a pass phrase longer than word may be used.

The data address is an address showing a top position of each job data 21 stored in the storage 20. The address can be a logical address but a physical address can be directly specified.

The data size shows the data size of each job. The data size is used in data readout when the image is formed. The total value of the data size of the plurality of job data 21 stored can be used to determine whether to erase old job data.

The image data stored as a portion of the job data 21 here is bitmap data (pixmap data, raster data) which is data obtained from the computer terminal 300 processed and converted to be directly used in the image forming operation by the image forming unit 70. Alternatively, this can be intermediate data (display list) or data described by PDL (Page Description Language).

The account information 22 includes setting information of the user who can use the MFP 100. The account information 22 can be set differently from the user of the LAN held by the server computer 200.

As shown in FIG. 3B, here, the account information 22 includes, for example, an account ID, a department ID, a position ID, and a use flag.

The account ID is an identification number (can include characters and symbols) to specify the user registered as being able to use the MFP 100. The account ID can be set separately from the account information held by the server computer 200. When set separately, the account ID here can be specified based on the job data received from the computer terminal 300 and the transmitting source.

The department ID is an ID showing the department where the user corresponding to the account ID belongs in the company. The position ID is an ID according to the position assigned to the user in the company. The relation of correspondence between the department ID and the department and the position ID and the position can be held separately in a table which is not shown.

The use flag is the flag showing whether the information of the set account ID is presently set. For example, when the account ID is temporarily moved to another department in the company, and is in an environment to be used in another MFP 100, the account ID can be used to temporarily pause the authorization to use the MFP 100 without erasing the account information.

The storage region of the storage 20 can be set divided in a plurality of areas (connected storage apparatus, folder and directory in storage apparatus) physically and/or logically. For example, the job data 21 and the account information 22 can be held in different areas. For example, among the job data 21, the job data 21 encrypted as a target of secure print and the job data 21 as the target of normal image forming can be held in different areas.

The communicating unit 30 performs control of transmitting and receiving data according to the predetermined communication standard through the network between the MFP 100 and the external devices such as the server computer 200 and the computer terminal 300. For example, as the communicating unit 30, the network card (LAN card) is used. Moreover, the communicating unit 30 may include a connecting terminal of a portable storage medium such as a USB memory. The data received by the communicating unit 30 may include job data regarding image forming, that is, image data as the target of image forming, image forming instruction (operation instruction to the image forming unit to perform image forming) and setting information regarding the image forming instruction.

The display/operation receiver 50 includes a display as a display unit, and a touch panel as an operation receiving unit provided overlapped on the display. The display/operation receiver 50 performs a display on the display based on control by the controller 10, and outputs to the controller 10 information such as position and continuing time of the touch operation detected on the touch panel as the operation information. The display/operation receiver 50 may include an LED lamp as a display, and may include a press button switch or a numeric keypad as an operation receiving unit.

The communicating unit 30 and the display/operation receiver 50 are included in an instruction obtaining unit according to the present embodiment. The display/operation receiver 50 can receive input of an authentication code such as a password by a touch panel and/or numeric keypad.

The image reader 60 performs scanning on the surface of the read medium based on control of the controller 10, generates image data of the image, and outputs the data to the storage 20. The image reader 60 includes a line sensor and the line sensor is moved relatively in relation to the read medium to obtain a two-dimensional image. The image reader 60 may include a two-dimensional sensor.

The communicating unit 30 and the image reader 60 are included in a data obtaining unit according to the present embodiment.

The image forming unit 70 forms an image on a supplied recording medium based on the image data held as the job data 21 based on the control by the controller 10. For example, the image forming unit 70 forms an image by attaching and fixing colorants such as toner or ink on the recording medium, but the image forming unit 70 is not limited to the above.

According to the above-described configuration, the MFP 100 may include a NFC communicating unit (Near Field Communication) which receives an authentication motion performed by the user in which the user places an IC card holding authentication information near a reading portion to receive and obtain the authentication information. In this case, the NFC communicating unit is included in the authentication receiving unit according to the present embodiment together with the display/operation receiver 50.

Next, the image forming operation performed in the MFP 100 according to the present embodiment is described.

The MFP 100 receives a job regarding image forming from the computer terminal 300 connected to the LAN to perform image forming. When the image data as the target of image forming is held in the MFP 100 in advance, the job data includes the image forming instruction and the setting information regarding the image forming. When the image data is not held by the MFP 100, the image data is included in the job data and the data is transmitted to the MFP 100. When the image data is held by the MFP 100, the user displays the contents of the job list 121 by input on the display/operation receiver 50, and the job (operation instruction) regarding the image forming is received by selecting the image data with which image forming is performed from the displayed list.

The computer terminal 300 is able to perform a secret setting (limit setting) regarding whether secure print (limit of receiving image forming instruction) is specified for each image which is to be the target of image forming. When secure print is specified in the job data including new image data, based on a request from the controller 10 simultaneously with the job data or after receiving the job data, the password (authentication information, authentication code) is transmitted from the computer terminal 300. This password can be set by the user or the computer terminal 300 can randomly generate the password and this can be transmitted and presented to the user. When the secure print is specified, the image data in the MFP 100 and the related information is encrypted and held.

When the image forming instruction in which secure print is specified is obtained, the display to receive input of the password is displayed as the authentication operation for the job (image forming instruction) on the display/operation receiver 50 of the MFP 100. When the password input and received on this display is determined to match with the password set for the image data, the reception of the image forming instruction is approved, the encrypted data is decrypted temporarily, and the image forming operation is performed by the image forming unit 70.

As described above, according to the MFP 100, each of the job data 21 is held until erased (including overwrite) according to a predetermined term or the storage capacity of the storage 20. In the MFP 100, each time a new job is added or an old job is erased, the job list 121 stored and held in the RAM 12 is updated and generated. The user performs the predetermined input on the display/operation reception 50 or transmits the list obtaining instruction to the MFP 100 with the computer terminal 300 to display on the display of the display/operation receiver 50 or the display of the computer terminal 300 the list of the job including the image which the user can output, that is, the image data. The user specifies the job ID and the file name from the list, and the user is able to instruct the MFP 100 to perform the image forming operation again. When secure print is specified in the image data regarding the specified job, in order to perform the image forming operation of the image data, the authentication operation is performed again through the display/operation receiver 50.

The user is able to instruct the setting change instruction for the secret setting regarding the specification of the secure print on the MFP 100 (the MFP 100 is able to obtain the setting change instruction from the user). For example, when it is not necessary to keep the contents of the held job data 21 a secret during the operation, the setting of whether secure print is set is switched from present to absent, and the authentication operation becomes unnecessary from the image forming operation at this point and after. In such jobs in which the setting is switched to absent, the user of the MFP 100 other than the user who input the job can instruct the image forming freely. The setting change instruction can be received through the communicating unit 30 from the external computer terminal 300 and/or predetermined input on the display/operation receiver 50.

Figure 4:
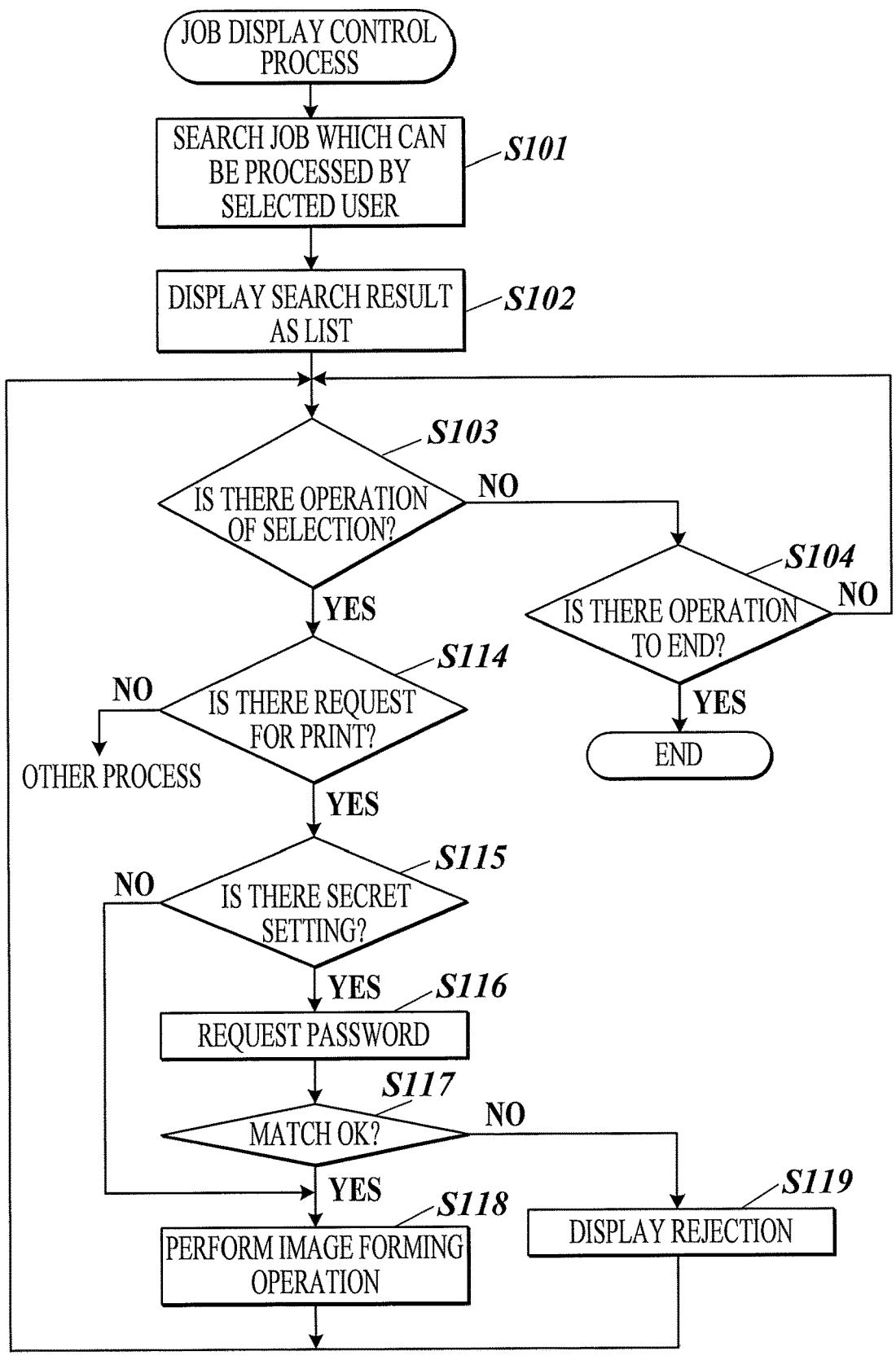
FIG. 4 is a flowchart showing a control process of a job display control process.

FIG. 4 is a flowchart showing a control process by the controller 10 controlling the job display control process executed in the MFP 100.

The job display control process is started when the request from the user to display the job list is input on the display/operation receiver 50 or the computer terminal 300.

When the job display control process is started, the controller 10 (CPU 11) specifies the user who made the request, and searches from the job list 121 the job in which the user can perform at least any of the processing instructions such as an image forming instruction or a setting changing instruction (step S101). The controller 10 displays the search result as a list (step S102). That is, according to the input source of the instruction, the controller 10 outputs the display data to be displayed on the display of the display/operation receiver 50 or outputs to the computer terminal 300 the information necessary for display on the computer terminal 300.

The controller 10 determines whether there is an operation to select any of the jobs (detect) (step S103). When it is determined that there is no operation ("NO" in step S103), the controller 10 determines whether the operation to end the display is detected (step S104). When it is determined that the end operation is detected ("YES" in step S104), the controller 10 ends the job display controlling process. When it is determined that it is not detected ("NO" in step S104), the process of the controller 10 returns to step S103.

In the process in step S103, when it is determined that there is an operation to select any of the jobs, ("YES" in step S103), the controller 10 determines whether there is a request to form (print) the image in the selected job (step S114). When it is determined that there is no request to form the image (there is no request regarding the other processes) ("NO" in step S114), the controller 10 starts the process related to the other processes.

When it is determined that there is a request to form the image ("YES" in step S114), the controller 10 determines whether there is a secret setting (specification of secure print) set for the image data in the selected job (step S115). When it is determined that there is a secret setting, ("YES" in step S115), the controller 10 requests the input of the password on the display/operation receiver 50 (step S116). The controller 10 waits for detection of input of the password on the display/operation receiver 50, obtains the input password, and determines whether the obtained password matches with the set password (step S117). When it is determined that there is a match ("YES" in step S117), the controller 10 controls the image forming unit 70 to perform the image forming operation using the image data in the selected job (step S118). Then, the process by the controller 10 returns to step S103.

When it is determined that the obtained password does not match with the set password ("NO" in step S117), the controller 10 controls the display/operation receiver 50 to display that the image forming is rejected (step S119). Then, the process by the controller 10 returns to step S103.

Figure 5:
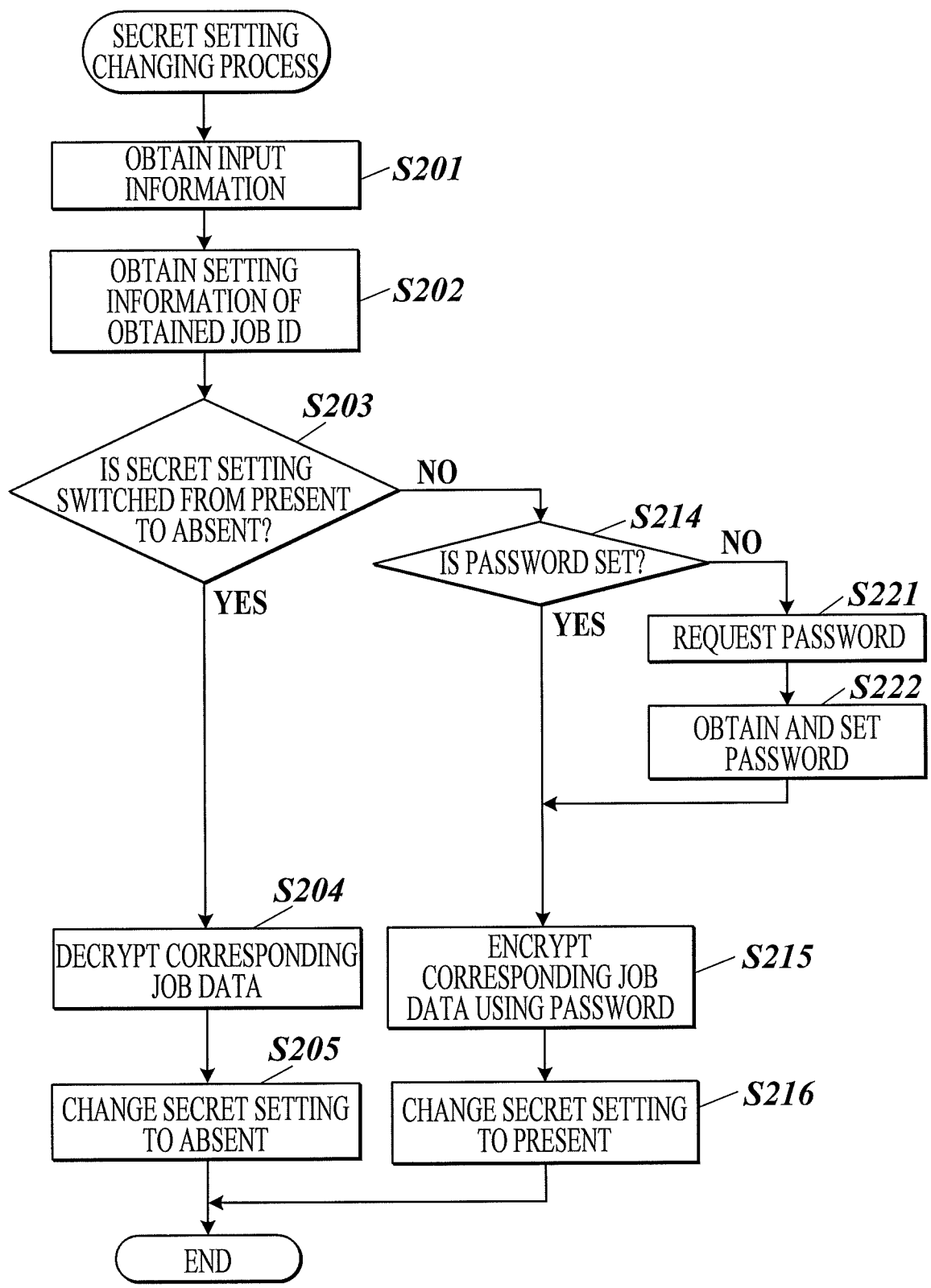
FIG. 5 is a flowchart showing a control process of a secret setting changing process according to a first embodiment.

FIG. 5 is a flowchart showing a control process by the controller 10 performed in the secret setting changing process executed in the MFP 100 according to the first embodiment. The secret setting changing process is started when the user inputs the setting changing instruction for the secret setting of the image data in the job selected from the above-described job list 121, for example. Normally, the setting change of the secret setting can be performed only by the person who first input the image data in the MFP 100.

When the secret setting changing process is started, the controller 10 (CPU 11) obtains input information, that is, a job ID (step S201). The controller 10 obtains the secret setting corresponding to the obtained job ID from the job list 121 (step S202).

The controller 10 determines whether there is an instruction to change the secret setting from present to absent (step S203). When it is determined that there is an instruction to change from present to absent ("YES" in step S203), the controller 10 decrypts the image data of the corresponding job data 21 and the related information (step S204), or changes the secret setting in the job list 121 to absent (step S205). The controller 10 does not erase the set password itself. Then, the controller 10 ends the secret setting changing process.

In the determining process in step S203, when it is determined that the instruction is not to change the secret setting from present to absent, that is, when it is determined that the instruction is to change the setting from absent to present ("NO" in step S203), the controller 10 determines whether the password is set (step S214). When it is determined that the password is set ("YES" in step S214), the controller 10 encrypts the image data of the job data 21 and the related information using the password (step S215). That is, here, the held password is used again. The controller 10 changes the setting of the secret setting in the job list 121 to present (step S216). Then, the controller 10 ends the secret setting changing process.

In the determining process in step S214, when it is determined that the password is not set ("NO" in step S214), the controller 10 makes a request to the source which transmitted the instruction to change the secret setting (display of the display/operation receiver 50 or computer terminal 300) to input the new password (step S221). The controller 10 waits for input of the password, obtains the input password, and sets the password in the job list 121 and the job data 21 (step S222). Then, the process by the controller 10 advances to step S215.

Figure 6:
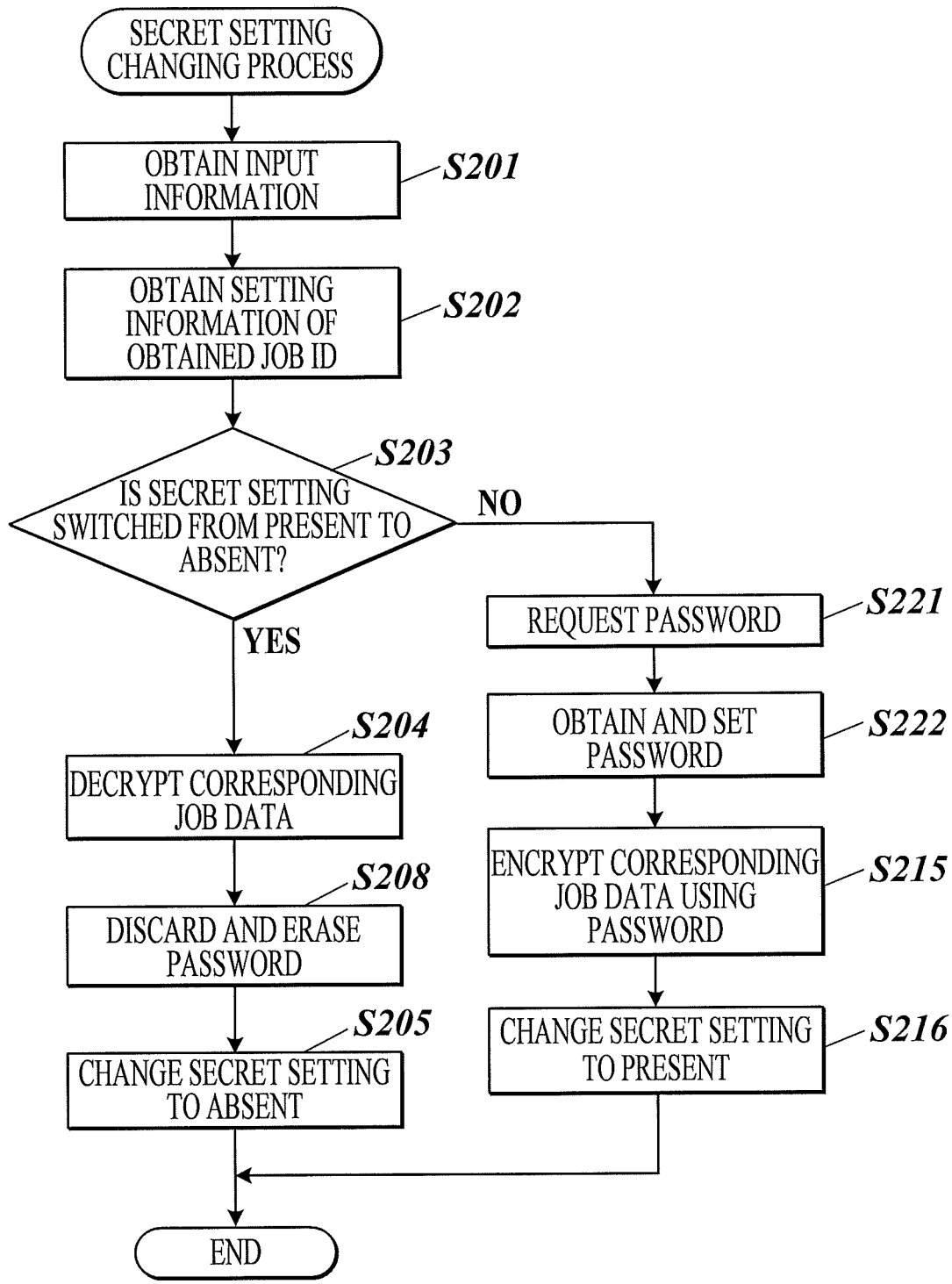
FIG. 6 is a flowchart showing a modification of the secret setting changing process.

FIG. 6 is a flowchart showing a modification of the secret setting changing process.

Comparing this secret setting changing process with the process according to the above-described embodiment, the process in step S208 is added, and the process in step S214 is omitted. The other processes are the same. The same reference numerals are applied to the same processes and the detailed description is omitted.

When the process in step S203 is "YES" and the decryption of the job data ends in the process in step S204, the controller 10 discards and erases the password set in the job data 21 and the job list 121 (step S208). Then, the process by the controller 10 advances to step S205.

When the process in step S203 is "NO", the process by the controller 10 advances to step S221.

That is, in this secret setting changing process, once the secret setting is cancelled and changed to absent, the password is discarded and erased, and when the secret setting is returned to present again, a newly obtained password is always set.

As described above, the MFP 100 which is the image forming apparatus according to the first embodiment includes the image forming unit 70 which forms an image based on the image data, the communicating unit 30 and the image reader 60 as data obtaining units which externally or internally (respective) obtain image data as a target of image forming, the storage 20 which stores image data included in the job data 21, the communicating unit 30 and the display/operation receiver 50 as instruction obtaining units which externally or internally (respective) obtain image forming instructions (operation instruction) to allow the image forming unit 70 to form the image, the display/operation receiver 50 which receives the input operation of the password (predetermined authentication operation) regarding approval of reception of the image forming instruction, and the controller 10 which controls the image forming unit 70 to form the image based on the image data if it is determined that the display/operation receiver 50 received the input of the password when the prohibit setting (limit setting) is set regarding the limit to receive the image forming instruction for the image data as the target of image forming by the obtained image forming instruction. The instruction obtaining unit is able to obtain the setting changing instruction which changes the prohibit setting, and the controller 10 changes the prohibit setting based on the obtained setting changing instruction.

As described above, according to the MFP 100, the image data of the image forming target is held for a while in the storage 20 and the image data can be repeatedly called to form the image, and further, secure print is possible to be able to change the necessity of the authentication operation regarding the secure print during the operation. Since it is possible to change the setting according to the change in the situation regarding whether the image data is a secret, when the image data becomes open and it is not necessary to keep the image data a secret, it becomes possible to form the image without the authentication process or the range that the authentication operation is needed can be switched flexibly. Therefore, in the MFP 100, it is possible to perform the image forming operation flexibly and conveniently without lowering the security level.

The controller 10 encrypts the image data with the prohibit setting and stores the data in the storage 20. Therefore, it is possible to avoid a situation in which the contents of the image data can be seen by those who have no authority to see the data stored in the storage 20, and the suitable security level can be maintained.

The MFP 100 includes a display/operation receiver 50 which receives the input process, and the MFP 100 receives the input process of the authentication code on the display/operation receiver 50. Therefore, it is possible to perform the operation regarding secure print suitably on the normal configuration of the MFP 100 without increase in cost or burden of changing design.

When the setting changing instruction to change the prohibit setting from present to absent is received by the instruction obtaining unit, the controller 10 does not erase the setting of the password (authentication code), and later, when the setting changing instruction to change the prohibit setting from absent to present is received, the setting of the password is used again. Therefore, the user does not have to be troubled by setting of the password each time, and does not have to remember a new password. With this, the prohibit setting can be changed easily and immediately.

When the setting changing instruction to change the prohibit setting from present to absent is received by the instruction obtaining unit, the controller 10 erases the setting of the password (authentication code), and then when the setting changing instruction to change the prohibit setting from absent to present is received, the controller 10 sets the authentication code newly obtained by the instruction obtaining unit. As described above, by switching the password each time, the security level of the image data regarding the secure print is suitably maintained, and it is possible to reduce the risk of the image data as the target of prohibit setting being seen by those who have no authority.

The display/operation receiver 50 is included in the instruction obtaining unit and the input operation of the setting changing instruction can be received on the display/operation receiver 50. Therefore, the change after the image forming can be easily performed on the spot such as when the user picks up the medium on which the image is formed at the medium ejecting unit of the MFP 100.

The communicating unit 30 which communicates with external devices is provided. The communicating unit 30 includes the instruction obtaining unit and the setting changing instruction can be obtained through the communicating unit 30. Therefore, when the user who first output the job including the image data cancels the setting in advance before performing the image forming again or changes the prohibit setting based on the schedule setting irrelevant from the image forming operation, the user does not have to go to the MFP 100 and is able to easily change the setting from the user's computer terminal 300.

Second Embodiment

Next, the image forming apparatus according to a second embodiment of the present invention is described.

The functional configuration of the MFP 100 which is the image forming apparatus according to the second embodiment is the same as the MFP 100 according to the first embodiment. The same reference numerals are used and the detailed description is omitted.

FIG. 7 is a table showing contents of the job list 121 held in the RAM 12 of the MFP 100 according to the present embodiment.

In the above job list 121, in addition to the items set in the job list 121 according to the first embodiment, a setting term (validity term) can be set for each job. The secret setting is set with three bits instead of a one bit flag.

The secret setting with three bits here include a secret setting regarding the department where the person who first output the image of the job belongs (person who input the image data to the MFP 100), secret setting regarding the position that the person who output the image data belongs, and the secret setting regarding only the person who output the image. That is, when the secret setting is "000", no secret setting is set and similar to conventional cases, the user of the MFP 100 is able to input the normal image forming instruction freely on the MFP 100.

In a case such as the job ID "01246", when the smallest digit bit (here the far right bit) of the secret setting is "1", the secret setting of the person who output is set. That is, only the user who input the image data in the MFP 100 first with the transmitting of the job is able to form and output the image of the image data by performing the authentication operation. The other users of the MFP 100 cannot output the image regardless of the department or the position.

When the smallest digit bit of the secret setting is "0" and the largest digit bit is "1", in a case such as the job ID "01248", the user of the MFP 100 who belongs to the same department as the person who input the image data, that is, the user (certain users) set with the same department ID can form and output the image of the image data by performing the authentication operation. When the intermediate bit is "1", the user of the MFP 100 who is in the position equal to or higher than the person who input the image data, that is, the user with the value of the position ID equal to or higher than the value of the person who input the image data is able to form and output the image by performing the authentication operation. When the largest digit bit and the intermediate bit are both "1", only the user of the MFP 100 who belongs to the same department as the person who input the image data and who is in the position equal to or higher than the person who input the image data is able to form and output the image by performing the authentication operation.

When the position is not a simple matter of higher or lower rank, the MFP 100 is able to hold a chart of the relation among positions or group information regarding the positions in the storage 20 in advance.

The setting term shows the validity term of the secret setting set at present. When the present secret setting is present, the secret setting can be switched to absent when the validity term passes. When the present secret setting is absent, the secret setting is switched to present at the validity term. When the secret setting is to be switched from absent to present, the password when the secret setting is set to present needs to be set in advance. The setting changing operation of the secret setting when the validity term passes is not always performed at the timing of the validity term. For example, the setting changing operation of the secret setting can be performed when the display request of the job list 121 is first obtained after the validity term passes or when the image forming instruction related to the secret setting is obtained.

Figure 8:
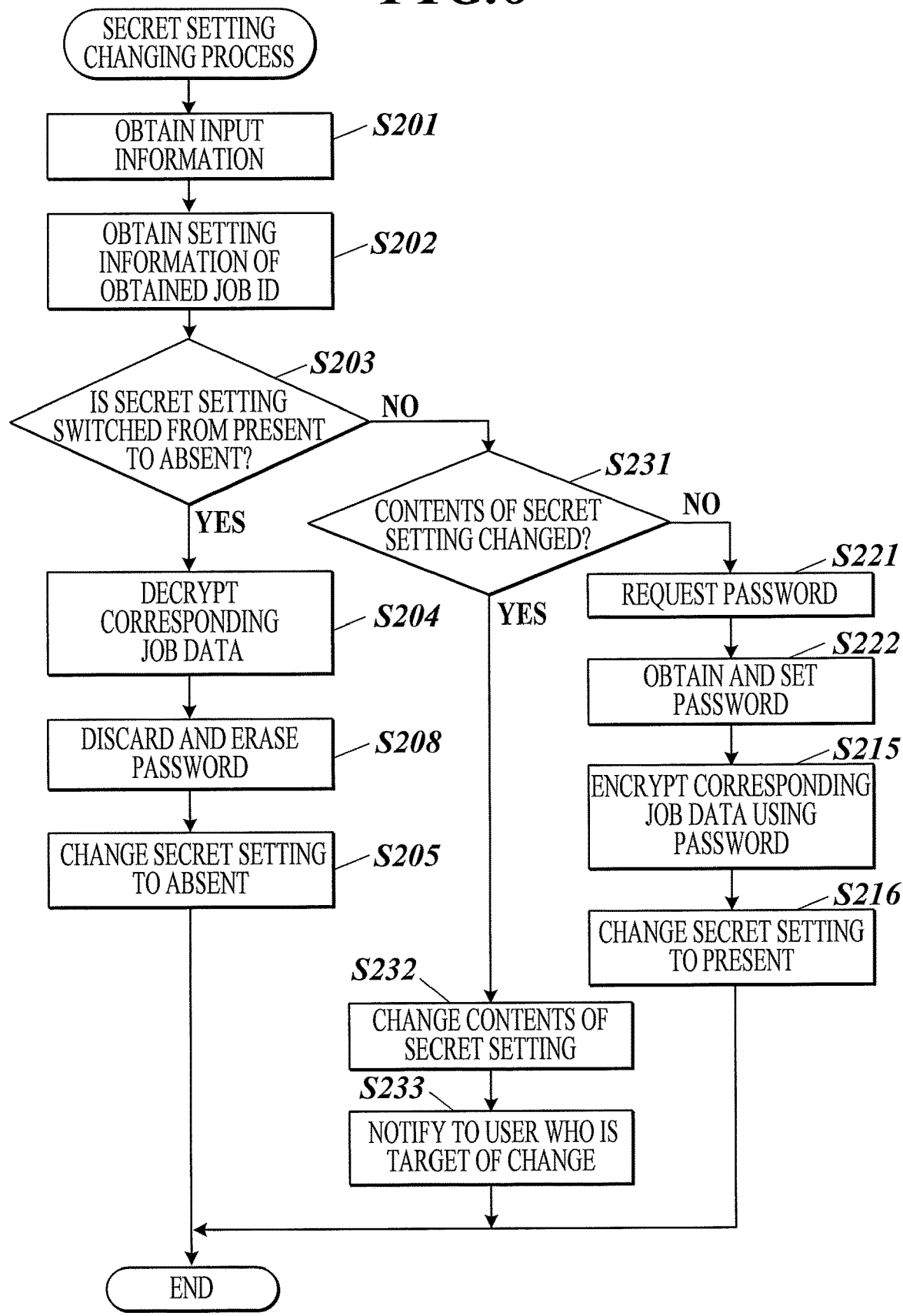
FIG. 8 is a flowchart showing a control process of the secret setting changing process according to a second embodiment.

FIG. 8 is a flowchart showing a control process by the controller 10 performed in the secret setting changing process executed in the MFP 100 according to the present embodiment.

In this secret setting changing process, the processes of steps S231 to S233 are added to the secret setting changing process according to the above-described modification. The other processes are the same. The same reference numerals are used for the same processes, and the description is omitted.

In the determining process in step S203, when the secret setting is not changed from present to absent and the process is "NO", that is, here, in addition to the change of the secret setting from absent to present, when the contents of the secret setting present state is changed, the process by the controller 10 advances to step S231.

The controller 10 determines whether the contents of the secret setting is changed in the secret setting present state (step S231). When there is no change in the contents in the secret setting present state, that is, when the secret setting is changed from absent to present ("NO" in step S231), the process by the controller 10 advances to step S221.

When it is determined that the secret setting is present and the contents are changed ("YES" in step S231), the controller 10 changes the contents of the secret setting in the job list 121 (step S232). The controller 10 refers to the account information 22 and extracts the newly added user from whom the image forming instruction of the image data in the job can be received due to the change in the contents. The controller 10 outputs the predetermined notification through the communicating unit 30 to the extracted user by methods such as transmitting e-mail (step S233). Such notification can include information (authentication code itself or place to confirm authentication code) of the password (authentication code). Then, the controller 10 ends the secret setting changing process.

As described above, in the MFP 100 as the image forming apparatus according to the second embodiment, the prohibit setting may include the setting of the validation term, and the controller 10 changes the set prohibit setting when the validation term passes. Here, when the term that the secret needs to be maintained is set in advance, by setting the validation term, the switching can be easily performed even if the person who inputs the job including the image data on the MFP 100 does not input the setting changing instruction again, and the convenience of the MFP 100 increases.

The account information 22 (user setting) regarding the user of the MFP 100 is stored in the storage 20, the prohibit setting can include the setting to be able to receive the image forming instruction from certain users, and the controller 10 determines whether the image forming instruction is received from the user from whom the image forming instruction of the image data can be received based on the prohibit setting and the account information 22.

That is, according to the MFP 100, it is possible to set that only certain users such as members of a certain department or members in a certain position or higher in a company in which the MFP 100 is connected through a network are able to perform the image forming based on the image data commonly, or the setting can be changed. The security level of the commonly used image forming apparatus can be suitably set, and the output of the image can be flexibly performed in the range that the predetermined image can be formed. With this, the convenience of a plurality of users can be enhanced.

When the contents of the prohibit setting is changed on the image data, the controller 10 outputs the notification regarding the change through the communicating unit 30 to the user from whom the image forming instruction can be received according to the prohibit setting. Therefore, the change of the setting that the image forming is possible can be easily notified without the user who made the setting change having to notify to all those that apply. With this, the convenience is enhanced.

The present invention is not limited to the above-described embodiments, and various modifications are possible.

For example, according to the present embodiment, the image data with the secret setting and the related information are encrypted, but the above items do not have to be encrypted. Alternatively, access to the folder or storage device storing the image data with the secret setting can be uniformly prohibited with the exception of access by the controller 10 approved in the authentication operation.

According to the present embodiment, when a request to display the job list is made, only the job regarding the image data which can receive the image forming request in response to the requesting user is displayed, but alternatively, at the time of display, the job list can be uniformly displayed without considering the user. In this case, it is possible to not display the file name and the data size of the image data with the secret setting. The user who desires to perform image forming again using the image data with the secret setting selects the necessary image data based on the job ID, ID of the person who output and/or the information of the obtained date/time.

According to the present embodiment, only the person who transmits the image data can change the setting of the secret setting. Alternatively, all of the users who can form the image using the image data can change the setting of the secret setting.

According to the present embodiment, the setting changing instruction of the secret setting can be performed from outside through the communicating unit 30 or from the display/operation receiver 50. Alternatively, it is possible to allow only either one of the above.

According to the present embodiment, the input user of the image forming instruction and the setting changing instruction is identified to determine whether the instruction can be received or not. Alternatively, it is possible to simply determine whether the instruction can be received or not based on only the input of the correct password (authentication code), without considering the user. The identification of the input user may be performed by the user inputting the user ID or by selecting from a list instead of performing the identification automatically.

According to the above-described embodiment, whether the image can be formed based on the image data with the secret setting can be determined based on the department or position, but the user who can form the image can be specified individually.

According to the above-described embodiment, only the presence/absence of the secret setting is switched when the validity term passes. Alternatively, it is possible to perform setting to switch so that some of the users can perform image forming with the secret setting when the validity term passes. Alternatively, the validity term is set not only once, and can be set a plurality of times. Alternatively, setting is possible to cancel the secret setting during a temporary setting change term, for example, for only a predetermined term.

According to the present embodiment, when the secret setting is changed, the notification can be performed to the user who can perform the image forming, but such function to perform notification does not have to be included. Moreover, the notification can be performed to not only the new users who can perform the image forming but also the users who could originally perform the image forming.

According to the present embodiment, the MFP 100 may uniquely hold the account information 22, but alternatively, this can be in coordination with the account information held by the server computer 200, or the authentication can be requested to the server computer 200.

According to the above-described embodiment, the MFP 100 is provided as the example of the image forming apparatus, but the apparatus does not have to be able to read (scan) the image. Any apparatus is possible as long as the apparatus is able to form an image obtained from a plurality of users.

The specific details such as the configuration, contents of control, and process of control as described in the above embodiment can be suitably modified without leaving the scope of the present invention.

The entire disclosure of Japanese Patent Application No. 2017-229903 filed on Nov. 30, 2017 is incorporated herein by reference in its entirety.

What is claimed is:

1. An image forming apparatus comprising:
a forming operating unit which performs image forming based on image data;
a data obtaining unit which obtains the image data as a target of the image forming;
a storage which stores the image data;
an instruction obtaining unit which obtains an operation instruction to instruct the forming operating unit to perform the image forming;
an authentication receiver which receives a predetermined authentication operation regarding approval of reception of the operation instruction; and
a hardware processor which performs the image forming based on the image data by controlling the forming operating unit when a limit setting regarding a limit of reception of the operation instruction is set on the image data as the target of the image forming according to the obtained operation instruction and it is determined that the authentication receiver received the authentication operation,
wherein,
the instruction obtaining unit obtains a setting changing instruction to change the limit setting;
the hardware processor changes the limit setting based on the obtained setting changing instruction,
when the setting changing instruction changes the limit setting to present, to require a secure print, the hardware processor requires an authentication code, and
after receiving the authentication code in response to the setting changing instruction, the hardware processor does not erase the authentication code when a next setting changing instruction changes the limit setting from present to absent is received by the instruction obtaining unit, and the hardware processor uses the authentication code again when the setting changing instruction to change the limit setting from absent to present is received.

2. The image forming apparatus according to claim 1, wherein the hardware processor encrypts the image data with the limit setting and stores the image data in the storage.

3. The image forming apparatus according to claim 1, further comprising an operation receiver which receives an input operation,
wherein the authentication receiver includes the operation receiver to receive the input operation of the authentication code on the operation receiver.

4. The image forming apparatus according to claim 3, wherein the hardware processor erases the setting of the authentication code when the setting changing instruction to change the limit setting from present to absent is received by the instruction obtaining unit, and then sets the authentication code newly obtained by the instruction obtaining unit when the setting changing instruction to change the limit setting from absent to present is received.

5. The image forming apparatus according to claim 1, wherein the limit setting includes a setting of a validation term; and
the hardware processor changes the set limit setting when the validation term passes.

6. The image forming apparatus according to claim 1, further comprising an operation receiver which receives an input operation,
wherein the instruction obtaining unit includes the operation receiver to receive the input operation of the setting changing instruction on the operation receiver.

7. The image forming apparatus according to claim 1, further comprising a communicating unit which communicates with external devices,
    wherein the instruction obtaining unit includes the communicating unit to obtain the setting changing instruction through the communicating unit.

8. The image forming apparatus according to claim 1, wherein,
    the storage stores a user setting regarding a user of the image forming apparatus,
    the limit setting includes the setting to be able to receive the operation instruction from certain users among the users, and
    the hardware processor determines whether the operation instruction is received from the user from whom the operation instruction regarding the image data can be received based on the limit setting and the user setting.

9. The image forming apparatus according to claim 8, further comprising a communicating unit which communicates with an external device,
    wherein the hardware processor outputs a notification regarding a change through the communicating unit to the user from whom the operation instruction can be received based on the limit setting when contents of the limit setting on the image data is changed.

\* \* \* \* \*